Figure 3:
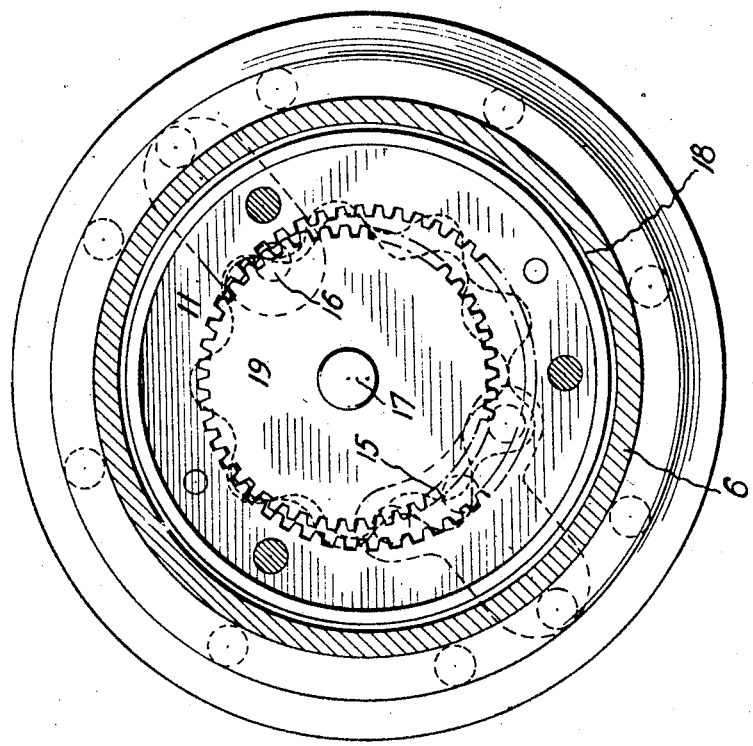

Nov. 8, 1927. 1,648,730
E. HILL
ROTARY PUMPING MACHINE
Filed Dec. 18, 1926 2 Sheets-Sheet 1
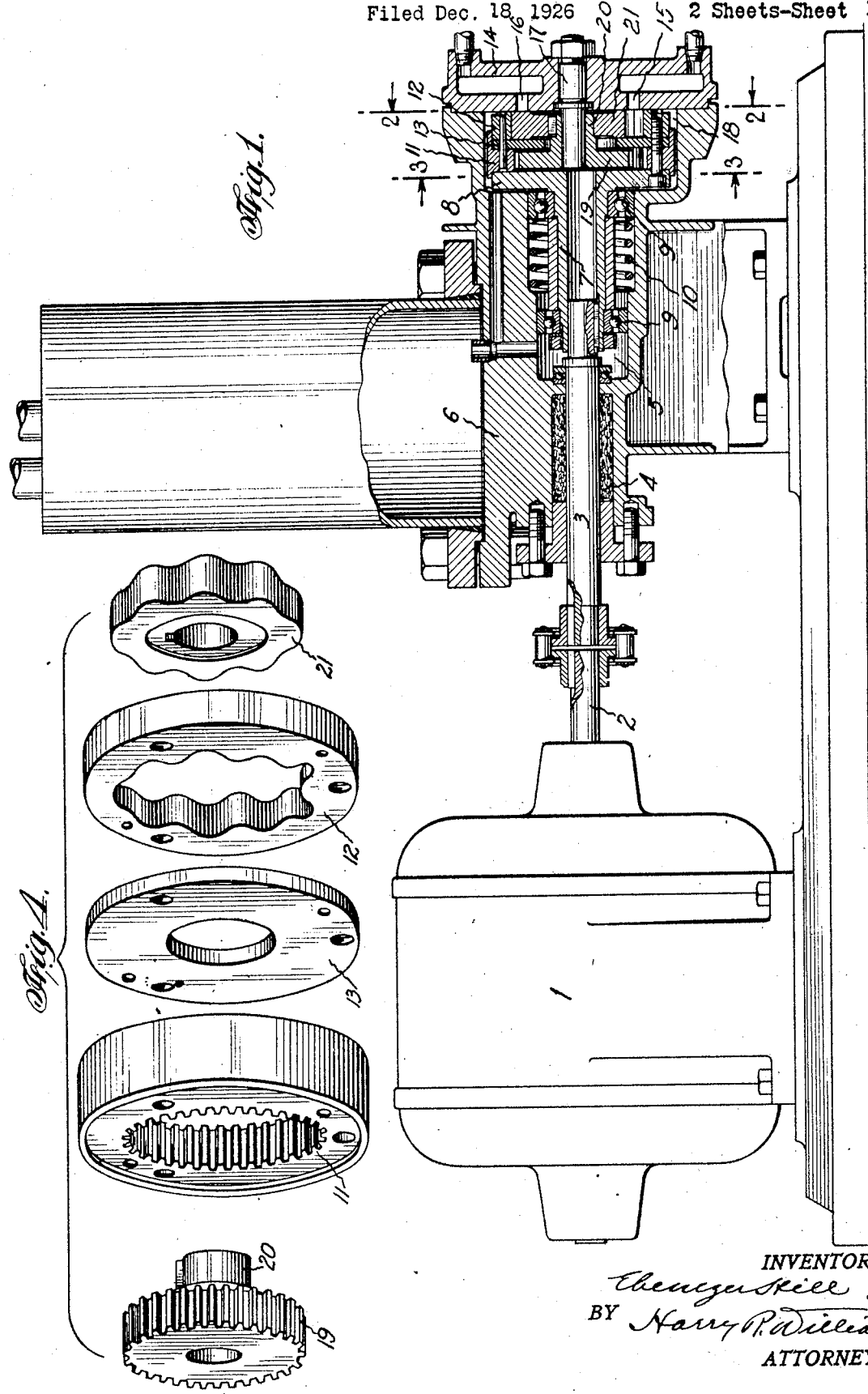
INVENTOR
Ebenezer Hill
BY Harry P. Williams
ATTORNEY Nov. 8, 1927.  
E. HILL  
1,648,730  
ROTARY PUMPING MACHINE  
Filed Dec. 18, 1926  
2 Sheets-Sheet 2

INVENTOR  
Ebenezer Hill  
BY Harry R. Williams  
ATTORNEY

Patented Nov. 8, 1927.

1,648,730

UNITED STATES PATENT OFFICE.

EBENEZER HILL, OF NORTH STAMFORD, CONNECTICUT, ASSIGNOR TO THE HILL COMPRESSOR & PUMP COMPANY, OF NEW YORK, N. Y., A CORPORATION OF DELAWARE.

ROTARY PUMPING MACHINE.

Application filed December 18, 1926. Serial No. 155,670.

This invention relates to the construction of rotary machines for pumping fluids of the class in which eccentrically mounted intermeshing cycloidal toothed gears having different numbers of teeth, are employed to pump liquids or compress air and other gases.

The object of the present invention is to so construct a pump of this character that the cycloidal gears will be relieved of driving engagement and required to maintain sealing engagement only, whereby when pumping there will be less load reaction and friction, with the consequent wear, between the teeth of the gears which are employed for pumping purposes, than in the prior pumps of the same type, thus increasing the efficiency of this class of pumps and enabling the same work to be done with the expenditure of much less driving power. For example, if the improved pumping machines are driven by electric motors they will accomplish the same work as the prior cycloidal gear pumping machines, with much less wattage.

It is a fundamental of gearing that the common normal to two contacting tooth surfaces should pass through the pitch points of the gears in order to give the maximum efficiency. In eccentrically arranged cycloidal gears there is but one point where the pressure angle is zero, and that is where the driving power is applied at right angles to the driven resistance. This is where the pitch circles are tangent, in the vicinity of full mesh of the teeth. From this locality where the driving power is applied with maximum effect, the pressure angle of the engaged tooth surfaces increases with the result that the driving force decreases to nothing at the point where the crests of the teeth contact.

In the prior machines where the driving power is transmitted directly from a cycloidal annular gear to a cycloidal pinion gear, which gears are also used to affect the pumping, there is therefore but one locality at which the maximum driving force is transmitted from the annular to the pinion. At the diametrically opposite point, in the old type, there is no driving contact. Between the point of maximum drive and the point of no drive the pressure angles, that is, the angles at which the force of the driving member is applied to the reacting driven member, are such that there is a powerful wedging action between the teeth which transmits heavy strains to the shaft and bearings and also causes friction and wear on the teeth, with a consequent great waste of power and undue heating.

The present invention is designed to overcome these disadvantages and render the machines more efficient. This is attained generally by arranging in the pumping chambers an auxiliary driving means, such as involute gears having a greater number of teeth than the cycloidal pumping gears, whereby the involute gears will do all of the driving and the cycloidal gears will be held in exact relation thereto and be only required to seal and pump, which arrangement relieves the cycloidal gears of all tendency to slip, wedge and wear.

Figure 2:
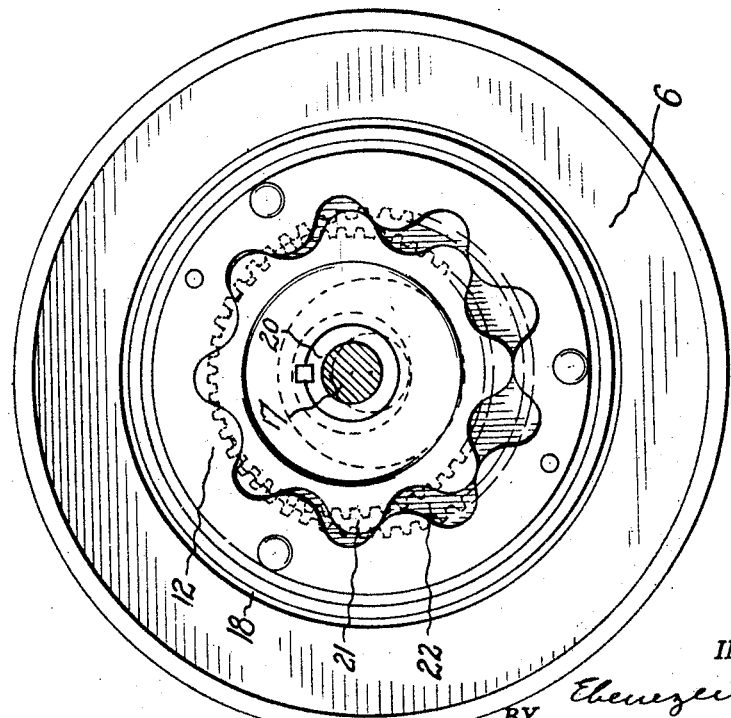

In the accompanying drawings Fig. 1 shows an elevation of an electrically driven machine that embodies the invention with the pump cut in central longitudinal section. Fig. 2 is a transverse section on the plane indicated by the dotted line 2—2 on Fig. 1. Fig. 3 is a transverse section on the plane indicated by the dotted line 3—3 on Fig. 1. Fig. 4 shows the driving and pumping elements separated but in their relative relations.

In the apparatus illustrated the operating power is obtained from the electric motor 1, the armature shaft 2 of which is coupled to the driving shaft 3 of the pump proper. The driving shaft is suitably packed by gland packing 4 and in the chamber 5 in the casing 6 is keyed to the hub 7 of the rotor disc 8, which hub is borne by anti-friction bearings 9. A spring 10 is arranged in the chamber in such manner as to, through one of the bearings, normally press the rotor forward.

Secured to the rotor disc, so as to be driven thereby, is an annular driving gear 11 with a large number of involute teeth, and an annular pumping gear 12 with a few cycloidal teeth. These gears are fastened together with their pitch circles coinciding. Between these gears an annular sealing plate 13 is fastened. These three members, the annular involute gear, the annular cycloidal gear, and the annular sealing plate are rigidly fastened together so they rotate as one part.

Removably secured to the end of the casing is a head 14 that contains an intake port 15 and a discharge port 16. A stud 17 is fastened in the head and extended into the pumping chamber 18. The axis of this stud is eccentric to the axis of the driving rotor disc and involute and cycloidal gears. In the pumping chamber and turning freely on this eccentric stud is a pinion 19 having a large number of involute teeth. The teeth of this pinion are conjugate to the teeth of the annular driving gear with which they mesh. Mounted on and keyed to the hub 20 of the pinion 19 is a pumping pinion 21 with cycloidal teeth which are conjugate to the cycloidal teeth of the annular pumping gear 12 with which they mesh. These pinions are concentric and their pitch circles coincide. The cycloidal annular and the cycloidal pinion, which are the pumping members in this machine, co-act during rotation to produce chambers 22 that during one half of a revolution expand and draw in liquid or gas from the intake port, and that during the other half of a revolution contract and discharge the fluid through the discharge port, in the manner described in Patent No. 1,486,835 issued to me March 11, 1924. In the structure illustrated the inner wall of the head forms the outer closure for the expanding and contracting chambers between the teeth of the cycloidal pumping gears, and the sealing plate forms the inner wall of these pumping chambers.

In the present arrangement all the driving power is transmitted through involute gears to the cycloidal gears, the cycloidal gears merely being required to make sealing contact sufficient to pump. The involute gears have more teeth than the cycloidal gears, but the teeth of the involute driving annular and pinion are related to each other in the same ratio as the teeth of the cycloidal pumping annular and pinion. As a result of this many more of the small involute teeth of the driving gears engage each other than do the larger cycloidal teeth of the pumping gears, consequently while with the cycloidal gears there are times when there is no maximum driving contact between the teeth, with the involute gears, owing to the number of teeth, there is no time in which there is no maximum driving contact. By fixing the cycloidal annular to the involute annular and the cycloidal pinion to the involute pinion, and driving by the involute gears the teeth of the cycloidal gears may be so shaped and always held in such position relative to each other that they need only contact sufficiently to pump, and thereby obviating all such wedging contact as follows when the drive is applied directly to the cycloidal gears.

To insure this action it is essential that the cycloidal annular be fixed accurately and rigidly to the involute annular, and that the cycloidal pinion be fixed to the involute pinion, and thus holding the cycloidal gears in exact relation to each other by the engagement of the teeth of the involute gears. Inasmuch as the involute annular and the cycloidal annular are securely attached to each other, and the involute pinion and the cycloidal pinion are securely attached to each other, and the eccentricity of the involute gears is the same as the eccentricity of the cycloidal gears, and as the ratio of speed of the involute gears is the same as the ratio of speed of the cycloidal gears, the cycloidal gears are always held in the proper relative positions for sealing between the teeth without having the defects resulting from any driving contact. This eliminates all wedging reaction of the cycloidal gears in the localities where the contacting tooth surfaces of the cycloidal gears are not at the common normal, that is, where the pressure angles are not zero, as it is at the point of tangency of the pitch circles in the vicinity of full mesh of the teeth. By eliminating such unproductive and detrimental resistance the pumping gears are enabled to perform their work with much less expenditure of driving power, and this of course greatly increases the efficiency of the rotary cycloidal gear pumping machine.

The invention claimed is:

1. A pumping machine comprising a casing, intermeshing driving gears mounted eccentrically one within the other within the casing and intermeshing pumping gears mounted eccentrically within the casing, said pumping gears being respectively connected to and driven and timed by and having the same eccentricity as the driving gears.

2. A pumping machine comprising a casing, intermeshing driving gears having involute teeth, mounted eccentrically within the casing and intermeshing pumping gears having cycloidal teeth mounted eccentrically within the casing, said pumping gears having the same eccentricity as and respectively connected to and driven by the driving gears.

3. A pumping machine comprising a casing, intermeshing annular and pinion driving gears mounted eccentrically within the casing and intermeshing annular and pinion pumping gears mounted eccentrically within the casing, said annular gears being fastened together and said pinions being fastened together.

4. A pumping machine comprising a casing, intermeshing annular and pinion involute gears mounted eccentrically within the casing and intermeshing annular and pinion cycloidal gears mounted eccentrically within the casing, said involute and cycloidal annular gears being fastened together and said involute and cycloidal pinion gears being fastened together.

5. A pumping machine comprising a casing, intermeshing driving gears mounted eccentrically within the casing, said driving gears having relatively small involute teeth, and intermeshing pumping gears mounted eccentrically within the casing, said pumping gears having relatively large cycloidal teeth, said pumping gears being driven and timed by the driving gears.

6. A pumping machine comprising a casing, intermeshing driving gears mounted eccentrically within the casing, said driving gears having a relatively large number of involute teeth and intermeshing pumping gears mounted eccentrically within the casing, said pumping gears having a relatively small number of cycloidal teeth, said pumping gears being driven and timed by the driving gears.

7. A pumping machine comprising a casing, intermeshing driving gears mounted eccentrically one within the other within the casing, intermeshing pumping gears mounted eccentrically within the casing, said pumping gears being respectively connected to and driven by and having the same eccentricity as the driving gears, and a seal plate interposed between the driving and pumping gears.

8. A pumping machine comprising a casing, intermeshing driving gears having involute teeth, mounted eccentrically within the casing, intermeshing pumping gears having cycloidal teeth, mounted eccentrically within the casing, said pumping gears being respectively connected to and driven by the driving gears, and a seal plate interposed between the involute gears and the cycloidal gears.

9. A pumping machine comprising a casing, intermeshing annular and pinion involute gears mounted eccentrically within the casing, intermeshing annular and pinion cycloidal gears mounted eccentrically within the casing, said involute and cycloidal annular gears being fastened together and said involute and cycloidal pinion gears being fastened together, and a seal plate interposed between said involute and cycloidal gears and fastened to and rotating with said annular gears.

10. A pumping machine comprising a casing, intermeshing annular and pinion driving gears mounted eccentrically within the casing, intermeshing annular and pinion pumping gears with cycloidal teeth mounted eccentrically within the casing, said annular gears being fastened together and said pinions being fastened together, a seal plate interposed between said gears and closing on one side the chambers between the cycloidal teeth, and a head removably attached to the casing and closing on the other side the chambers between the cycloidal teeth.

11. A pumping machine comprising a casing, intermeshing pumping gears mounted eccentrically one within the other in the casing, and intermeshing driving gears mounted eccentrically one within the other in the casing and respectively connected to the pumping gears, said pumping gears and driving gears all rotating in the same direction.

12. A pumping machine comprising a casing, intermeshing pumping gears mounted eccentrically one within the other in the casing and intermeshing driving gears mounted eccentrically one within the other in the casing and respectively connected with the pumping gears, said driving gears rotating in the same direction and at different speeds.

EBENEZER HILL.